No. 754,157. PATENTED MAR. 8, 1904.
J. F. McCORMICK.
DEVICE FOR CHALKING LINES.
APPLICATION FILED NOV. 16, 1903.
NO MODEL. 2 SHEETS—SHEET 1.
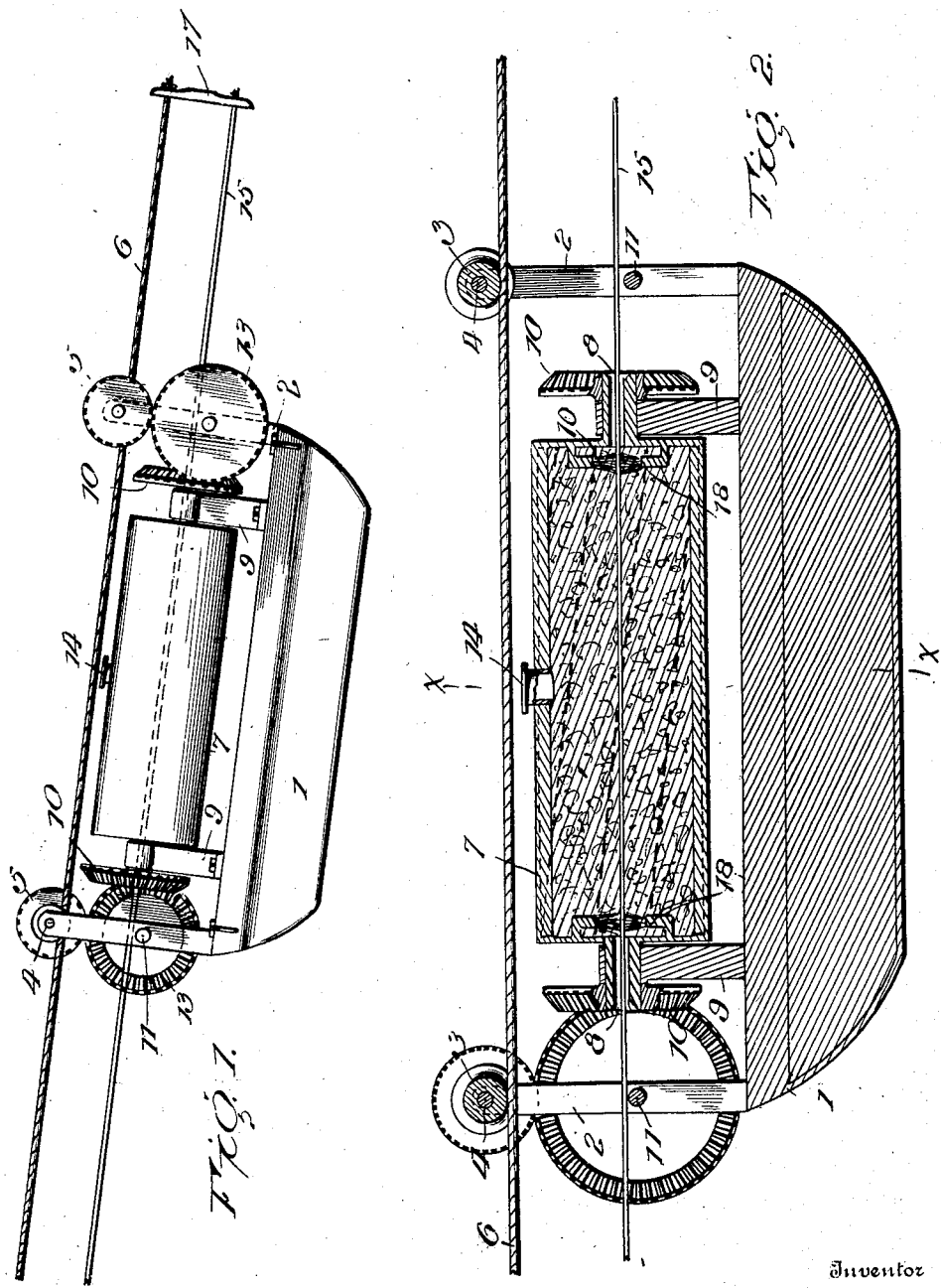
Witnesses
J. H. Johnstone
Emily H. England.
Inventor
J. F. McCormick
By
R. A. P. Lacey, Attorneys No. 754,157. PATENTED MAR. 8, 1904.
J. F. McCORMICK.
DEVICE FOR CHALKING LINES.
APPLICATION FILED NOV. 16, 1903.
NO MODEL. 2 SHEETS—SHEET 2.

Witnesses
J. H. Johnston.
Emily H. England.

Inventor
J. F. McCormick
By R. S. & A. B. Lacey, Attorneys.

No. 754,157. Patented March 8, 1904.

UNITED STATES PATENT OFFICE.

JOHN F. McCORMICK, OF NEAR CHURUBUSCO, INDIANA.

DEVICE FOR CHALKING LINES.

SPECIFICATION forming part of Letters Patent No. 754,157, dated March 8, 1904.

Application filed November 16, 1903. Serial No. 181,428. (No model.)

*To all whom it may concern:*

Be it known that I, JOHN F. McCORMICK, a citizen of the United States, residing in Allen county, near Churubusco, in the county of Whitley and State of Indiana, have invented certain new and useful Improvements in Devices for Chalking Lines, of which the following is a specification.

It is common in building operations to resort to the chalk-line for laying off work, and when the distance between operating points is of any extent and the chalk-line is required to be used frequently considerable loss of time results from one or the other workman traversing the space to properly chalk the line when required. If the space between the points is dangerous, as when shingling roofs, the risk, added to the loss of time, is a material factor, rendering the work hazardous.

The present invention aims to devise a mechanism for automatically chalking the line and obviating the necessity of the workman either drawing the line from one side to the other or traveling the distance between the points. The chalking device comprises a carriage adapted to move back and forth between the ends of the chalk-line, a chalker for supplying the line with the marking material or pigment, and actuating and distributing means operated by the movement of the carriage.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 3:
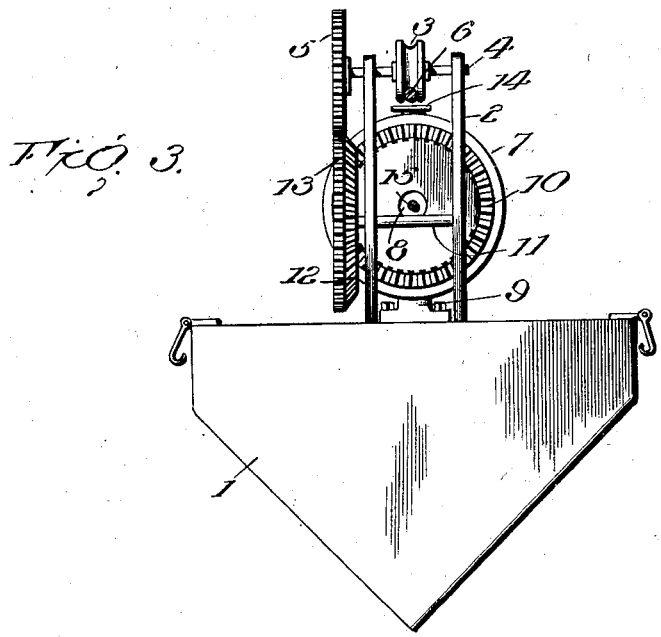
Figure 4:
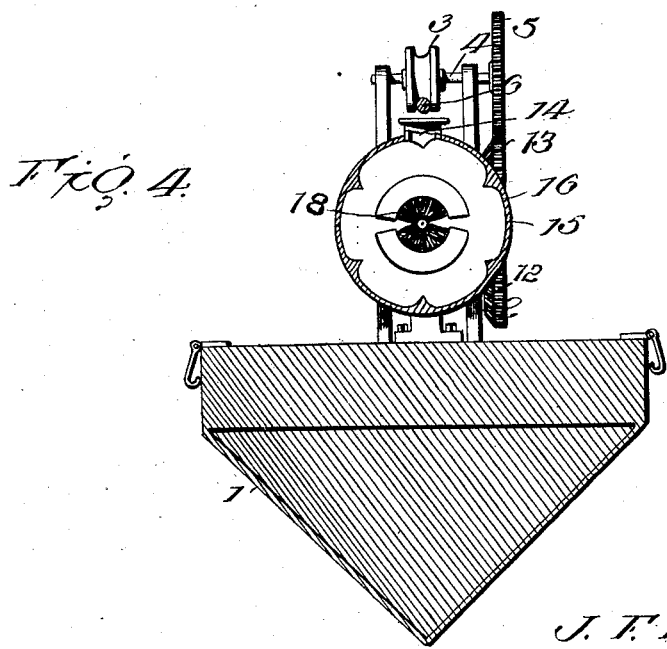

Figure 1 is a side view of a device for chalking lines embodying the invention. Fig. 2 is a central longitudinal section thereof, showing the parts on a larger scale. Fig. 3 is an end view. Fig. 4 is a cross-section on the line X X of Fig. 2.

Corresponding and like parts are referred to in the following description and indicated in all the views of the drawings by the same reference characters.

The carriage comprises the body 1, uprights 2, and pulleys 3, the latter being secured to shafts 4, journaled to the upper ends of the uprights 2 and having a gear-wheel 5 at one end. The body 1 may be of any construction and is sufficiently heavy to insure movement of the carriage upon a track or line 6 by gravitative force when said line or track is inclined to the horizontal about as shown in Fig. 1.

The means for distributing the chalk or pigment consist of a drum 7, provided at its ends with tubular journals 8, post 9, projected upward from the body of the carriage and receiving the journals 8, bevel gear-wheels 10 at the outer ends of the journals 8, and intermediate gearing connecting the parts 5 and 10, said gearing consisting of shafts 11, journaled in the uprights 2, bevel-gearing 12, rotatable with the shaft and in mesh with the bevel-gearing 10, and gear-wheels 13 in mesh with the gear-wheels 5. For convenience the gearing 12 and 13 is of integral formation, although this is not essential. The drum 7 may be of any size and construction and is provided with an opening 14, through which the chalk, pigment, or like material is supplied to the drum for distribution to the chalk-line 15. It is preferred to use the chalk or pigment in powdered form, thereby minimizing the resistance to the travel of the carriage and insuring a thorough chalking of the line by the device. A series of ribs or flights 16 are provided upon the inner side of the drum 7 to engage with the chalk or pigment and carry the same upward and drop it upon the line, thereby insuring effective chalking of the line even though a small amount of material is contained within the drum. The ribs or flights 16 are preferably inclined, thereby insuring a constant supply of the chalk or like material to the line in the operation of the device.

The chalk-line 15 passes centrally through the drum and through the openings of the journals 8 and is adapted to be made fast at its ends in any convenient way. The line or track 6 may be a cord or wire and is arranged to extend parallel with the chalk-line when both parts 6 and 15 are under tension. In the preferable construction both the track 6 and chalk-line 15 are secured to a bar or handpiece 17, which when grasped at a point intermediate of the parts 6 and 15 and pulled upon subjects them to about equal tension, and by elevating or lowering one or the other end of the track 6 the chalking device is caused to move thereon by a gravitative force, the line 15 being supplied with chalk or like material by running through the drum 7, as will be readily understood.

The openings through the journals 8 are of a size to admit of the chalk-line 15 passing readily therethrough, and in order to prevent wasting of the chalk, the surplus amount is removed from the chalk-line by brushes 18, secured to the ends of the drum, as shown most clearly in Fig. 2. These brushes also prevent the escape of chalk through the journals when the device is not in active service.

While it is preferred to utilize the line 6 for supporting the carriage, nevertheless it is contemplated within the purview of the invention to dispense with said line and to utilize the chalk-line 15 in the capacity of a track. When the line 6 is dispensed with, supporting-pulleys 3 are arranged so as to travel upon the chalk-line and are geared in any manner to the drum so as to effect rotation thereof.

Having thus described the invention, what is claimed as new is—

1. In a device for chalking lines, a drum for receiving the loose chalk or like material, a line passed through the drum and in coaxial alinement with the end portions thereof, and means for imparting a rotary movement to said drum about the line in the passage of the latter therethrough, substantially as set forth.

2. In a device for chalking lines, a drum for containing the material in powdered form, means for imparting rotary movement to the drum as the chalk-line passes therethrough, and ribs upon the inner side of the drum to carry the material upward and drop it upon the line, substantially as set forth.

3. In a device for chalking lines, a drum for containing the material in powdered form, means for imparting rotary movement to the drum as the chalk-line passes therethrough, and ribs provided upon the inner side of the drum and having a spiral arrangement to effect a continuous discharge of the material upon the line in the operation of the device, substantially as described.

4. In a device for chalking lines, a drum having centrally-disposed openings at its ends for the passage of the chalk-line, a track for suspending the device, and gearing for imparting rotation to the drum from the track as the device travels thereon, substantially as set forth.

5. In combination, a track, a carriage suspended therefrom, a chalking device journaled to the carriage, and means for imparting rotation to the chalking device by the movement of the carriage on the track, substantially as specified.

6. In combination, a track, a carriage mounted to travel upon said track, a drum mounted upon the carriage and having end openings for the passage of a chalk-line, and gearing for transmitting motion from the rotary supports of the carriage to the drum to effect rotation of the latter during the travel of the carriage, substantially as set forth.

7. In a device for chalking lines, a drum for receiving powdered chalk or like material and having centrally-disposed end openings, a line passed through the drum and the end openings thereof, means for rotating the drum about the line in the passage of the latter therethrough, and brushes applied to the inner sides of the ends of the drum and rotatable therewith about the line to remove surplus chalk therefrom, substantially as described.

In testimony whereof I affix my signature in presence of two witnesses.

JOHN F. McCORMICK. [L. S.]

Witnesses:
LAWRENCE A. BOGGS,
A. B. CRAIG.